(12) United States Patent
Raj

(10) Patent No.: US 11,908,072 B2
(45) Date of Patent: Feb. 20, 2024

(54) SYSTEM AND METHOD FOR GENERATING AND INTERACTING WITH A VIRTUAL MODEL OF A PHYSICAL ENTITY

(71) Applicant: Tooliqa Inc., Wilmington, DE (US)

(72) Inventor: Aditya Raj, Gurugram (IN)

(73) Assignee: Tooliqa Inc., Wilmington, DE (US)

( * ) Notice: Subject to any disclaimer, the term of this patent is extended or adjusted under 35 U.S.C. 154(b) by 203 days.

(21) Appl. No.: 17/709,504

(22) Filed: Mar. 31, 2022

(65) Prior Publication Data

US 2023/0316641 A1 Oct. 5, 2023

(51) Int. Cl.
*G06T 17/00* (2006.01)
*G06T 19/20* (2011.01)

(52) U.S. Cl.
CPC .............. *G06T 17/00* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 9,055,973 B2 | 6/2015 | Varma | |
| 9,142,062 B2 | 9/2015 | Maciocci et al. | |
| 10,839,585 B2* | 11/2020 | Lee | G06T 13/40 |
| 11,710,309 B2* | 7/2023 | Shotton | G06V 20/20 |
| | | | 382/159 |
| 2018/0322623 A1* | 11/2018 | Memo | G06N 3/084 |
| 2020/0200872 A1 | 6/2020 | Böckem et al. | |
| 2020/0301799 A1* | 9/2020 | Manivasagam | G01S 17/89 |
| 2021/0279957 A1* | 9/2021 | Eder | G06Q 40/08 |

OTHER PUBLICATIONS

Sergio Orts-Escolano Et. al, Holoportation: Virtual 3D Teleportation in Real-time, Oct. 16, 2016.

* cited by examiner

*Primary Examiner* — Kent W Chang
*Assistant Examiner* — Jonathan M Cofino
(74) *Attorney, Agent, or Firm* — Jason C. Cameron

(57) ABSTRACT

A system for generating and interacting with a virtual model of a physical entity is disclosed. The system includes a processing subsystem which includes an input module which receives preference(s) and data corresponding to parameter(s). The processing subsystem also includes a model generation module which performs a fusion operation on the data, thereby generating point cloud data and generates a crude virtual model corresponding to the physical entity. The processing subsystem also includes a model improvement module which performs cleaning and optimization of the crude virtual model, generates the virtual model, identifies multiple objects associated with the physical entity, and generates sub-virtual model(s) for the multiple objects. The processing subsystem also includes a model modification module which generates a trigger signal, receives modification-related input(s), and performs modification(s) on at least one of the virtual model and the sub-virtual model(s), thereby generating and interacting with the virtual model.

11 Claims, 5 Drawing Sheets

SYSTEM AND METHOD FOR GENERATING AND INTERACTING WITH A VIRTUAL MODEL OF A PHYSICAL ENTITY

FIELD OF INVENTION

Embodiments of the present disclosure relate to a field of generating virtual models, and more particularly to, a system and a method for generating and interacting with a virtual model of a physical entity.

BACKGROUND

In the past few decades, virtual reality (VR) has been widely used in many different areas including entertainment, education and training, manufacturing, medical, and rehabilitation. Three-dimensional (3-D) modeling and computer graphics techniques are not only useful for creating virtual models for computer simulation, artificial intelligence (AI), big data analytics, and other purposes but they can also be used in a variety of virtual reality applications (VR). The computer graphics effect and visual realism, on the other hand, are frequently trade-offs in VR with real-time and realistic interaction.

Also, the world consists of elements that are 3-D in nature, however, such elements are learned in a two-dimensional (2-D) space. For example, in a case of designing a building, the building consists of 2-D structures. However, an architect and interior designer create 2-D maps to represent the 3-D structures. Even in an education system, the kids are taught about 3-D creature animals using the animal 2-D images in books. There are multiple approaches existing for recreating and modifying 3-D models. However, such multiple approaches are less efficient and less reliable because such multiple approaches provide less synchronized and imprecise measurements. Also, such multiple approaches fail to generate an accurate model when objects are positioned far away from a capturing point.

Hence, there is a need for an improved system and method for generating and interacting with a virtual model of a physical entity which addresses the aforementioned issues.

BRIEF DESCRIPTION

In accordance with an embodiment of the present disclosure, a system for generating and interacting with a virtual model of a physical entity is provided. The system includes a processing subsystem. The processing subsystem is configured to execute on a network to control bidirectional communications among a plurality of modules. The processing subsystem includes an input module. The input module is configured to receive one or more preferences from a user, upon registration. The one or more preferences are corresponding to a generation of the virtual model. The input module is also configured to receive data corresponding to one or more parameters, based on the corresponding one or more preferences in real-time. The data includes at least one of two-dimensional annotated data and three-dimensional annotated data. The data is captured via a plurality of data capturing units positioned in a predefined manner. The predefined manner enables the capturing of the data from a plurality of viewpoints. The one or more parameters are corresponding to a plurality of objects associated with the physical entity. The processing subsystem also includes a model generation module operatively coupled to the input module. The model generation module is configured to perform a fusion operation on the data received from each of the plurality of data capturing units, by synchronizing and performing spatial mapping of the data using artificial intelligence, thereby generating point cloud data. The model generation module is also configured to generate a crude virtual model corresponding to the physical entity based on the corresponding point cloud data. Further, the processing subsystem also includes a model improvement module operatively coupled to the model generation module. The model improvement module is configured to perform cleaning and optimization of the crude virtual model by creating one or more regular shapes corresponding to one or more elements associated with the crude virtual model, based on historic shape-related data using artificial intelligence and an iterative closest point technique. The model improvement module is also configured to generate the virtual model corresponding to the physical entity upon performing the cleaning and optimization of the crude virtual model to remove noise. Further, the model improvement module is also configured to identify the plurality of objects associated with the physical entity by performing an object detection operation on the corresponding virtual model using image processing. Furthermore, the model improvement module is also configured to generate one or more sub-virtual models for the corresponding plurality of objects by performing a segmentation operation on the corresponding virtual model using image processing, upon identification. Furthermore, the processing subsystem also includes a model modification module operatively coupled to the model improvement module. The model modification module is configured to generate a trigger signal to be transmitted to the user, for modifying at least one of the virtual model and the one or more sub-virtual models. The model modification module is also configured to receive one or more modification-related inputs from the user in real-time upon receiving the trigger signal. Further, the model modification module is also configured to perform one or more modifications on at least one of the virtual model and the one or more sub-virtual models using one or more modification techniques, based on at least one of the corresponding one or more preferences and the corresponding one or more modification-related inputs, thereby generating and interacting with the virtual model of the physical entity.

In accordance with another embodiment of the present disclosure, a method for generating and interacting with a virtual model of a physical entity is provided. The method includes receiving one or more preferences from a user, upon registration, wherein the one or more preferences are corresponding to a generation of the virtual model. The method further includes receiving data corresponding to one or more parameters, based on the corresponding one or more preferences in real-time. Further, the method also includes performing a fusion operation on the data received from each of the plurality of data capturing units, by synchronizing and performing spatial mapping of the data using artificial intelligence, thereby generating point cloud data. Furthermore, the method also includes generating a crude virtual model corresponding to the physical entity based on the corresponding point cloud data. Furthermore, the method also includes performing cleaning and optimization of the crude virtual model by creating one or more regular shapes corresponding to one or more elements associated with the crude virtual model, based on historic shape-related data using artificial intelligence and an iterative closest point technique. Furthermore, the method also includes generating the virtual model corresponding to the physical entity upon performing the cleaning and optimization of the crude virtual model to remove noise. Furthermore, the method also includes identifying the plurality of objects associated with the physical entity by performing an object detection operation on the corresponding virtual model using image processing. Furthermore, the method also includes generating one or more sub-virtual models for the corresponding plurality of objects by performing a segmentation operation on the corresponding virtual model using image processing, upon identification. Furthermore, the method also includes generating a trigger signal to be transmitted to the user, for modifying at least one of the virtual model and the one or more sub-virtual models. Furthermore, the method also includes receiving one or more modification-related inputs from the user in real-time upon receiving the trigger signal. Furthermore, the method also includes performing one or more modifications on at least one of the virtual model and the one or more sub-virtual models using one or more modification techniques, based on at least one of the corresponding one or more preferences and the corresponding one or more modification-related inputs, thereby generating and interacting with the virtual model of the physical entity.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which:

FIG. 4 (b) illustrates continued steps of the method of FIG. 4 (a) in accordance with an embodiment of the present disclosure.

Figure 1:
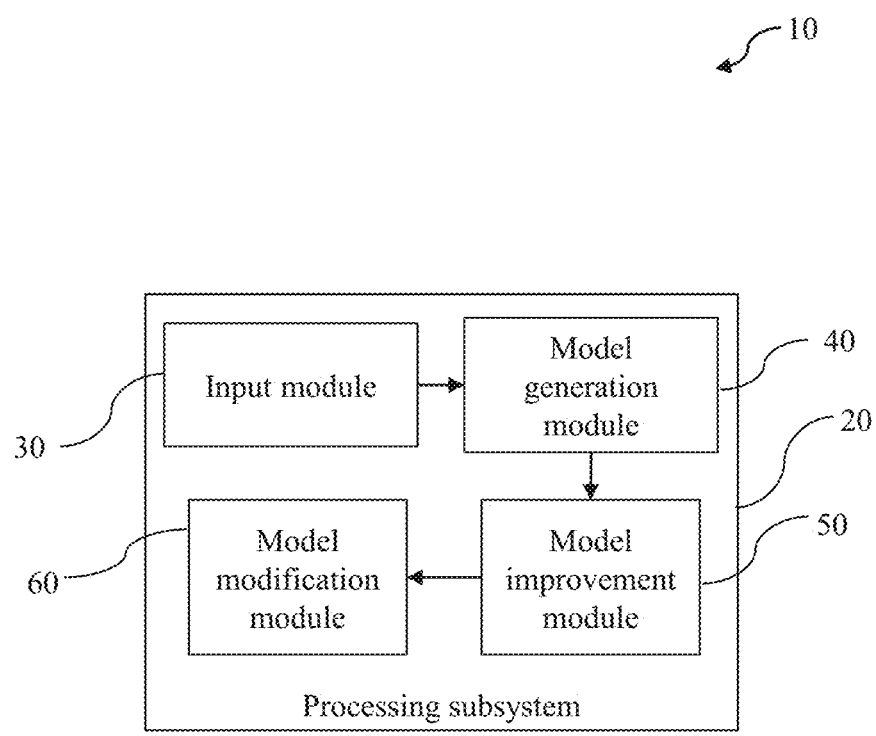
FIG. 1 is a block diagram representation of a system for generating and interacting with a virtual model of a physical entity in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method for generating and interacting with a virtual model of a physical entity. As used herein, the term "virtual model" is defined as a digital representation that serves as the real-time digital counterpart of a physical object, a physical space, or a process. Further, the system described hereafter in FIG. 1 is the system for generating and interacting with the virtual model of the physical entity.

FIG. 1 is a block diagram representation of a system 10 for generating and interacting with a virtual model of a physical entity in accordance with an embodiment of the present disclosure. In one embodiment, the virtual model may be a three-dimensional (3-D) virtual model. Further, in an embodiment, the physical entity may be a physical space, a physical device, a person, an animal, an object, or the like. More specifically, in one exemplary embodiment, the physical entity may include a complete environment having several objects, a building, a factory inner space, human organs, locomotives, vehicles, or the like. Therefore, in an embodiment, the virtual model may be a real-time digital counterpart of the corresponding physical entity. In one exemplary embodiment, the virtual model of the physical entity may be needed for simulating a fabrication process, for simulating a structural behavior of a part, in a learning field, in designing, in virtual reality, in augmented reality, in mixed reality, in extended reality, or the like. Further, an interaction with the corresponding virtual model may be needed to enable a user of the system 10 to do any kind of modifications with the corresponding virtual model based on a requirement of the user for multiple purposes. In one embodiment, the user may be a teacher, a contractor, an engineer, a project manager, or the like. Further, in an embodiment, the multiple purposes may include teaching and learning, prototyping, experimenting, design analysis, or the like.

Therefore, for the system 10 to be able to perform several steps involved in enabling the user to generate and interact with the virtual model, the system 10 includes a processing subsystem 20. In one embodiment, the processing subsystem 20 may be hosted on a server. In such an embodiment, the server may be a cloud-based server. In such another embodiment, parts of the server may be a local server coupled to a user device. The processing subsystem 20 is configured to execute on a network to control bidirectional communications among a plurality of modules. In one embodiment, the network may include one or more terrestrial and/or satellite networks interconnected to communicatively connect the user device to a web server engine. In one example, the network may be a private or public local area network (LAN) or Wide Area Network (WAN), such as Internet. In another embodiment, the network may include both wired and wireless communications according to one or more standards and/or via one or more transport mediums. In one example, the network may include wireless communications according to one of 802.11 or Bluetooth specification sets, or another standard or proprietary wireless communication protocol. In yet another embodiment, the network may also include communications over a terrestrial cellular network, including, a GSM (global system for mobile communications), CDMA (code division multiple access), and/or EDGE (enhanced data for global evolution) network.

Initially, the system 10 may have to receive certain inputs, so that the system 10 may process the same and respond accordingly. Therefore, the processing subsystem 20 includes an input module 30. The input module 30 is configured to receive one or more preferences from the user, upon registration. The one or more preferences are corresponding to a generation of the virtual model. Basically, in an embodiment, the one or more preferences may provide the user to decide a kind of the virtual model, which the user may be willing to generate of the physical entity. In one exemplary embodiment, the one or more preferences may include at least one of activating or deactivating certain sensors used for monitoring the physical entity, mentioning specifications related to one or more parameters corresponding to a plurality of objects associated with the physical entity, specifying about one or more technologies that can be used, and the like.

In one exemplary embodiment, the plurality of objects associated with the physical entity may include furniture, rooms, electronic items, and the like when the physical entity may be a building, trees, pathways, roadside signboards, vehicles, and the like when the physical entity may be an environment having several objects, or the like. Further, in an embodiment, the one or more parameters may include at least one of distance, color, alignment, movement, temperature, and the like.

Figure 2:
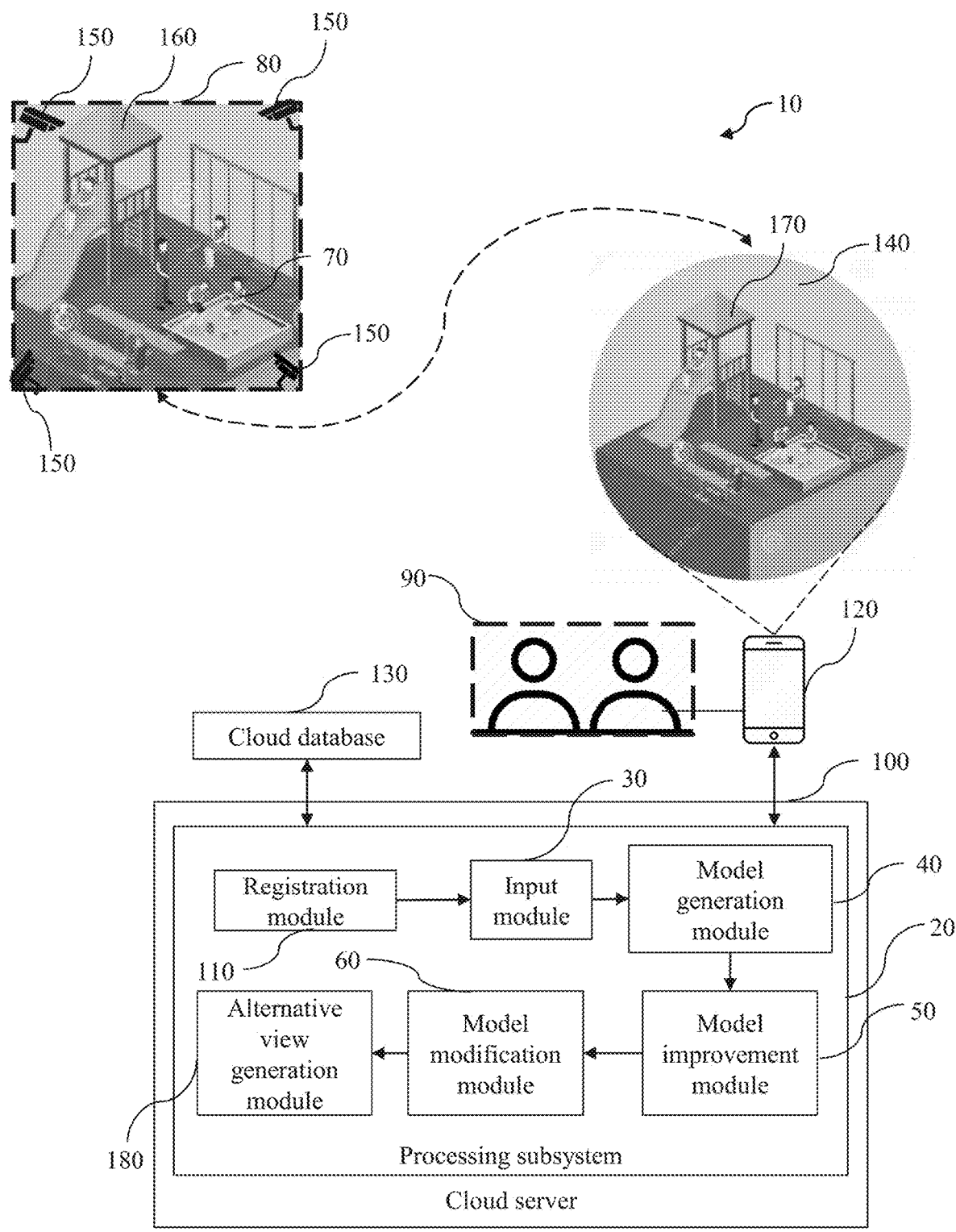
FIG. 2 is a block diagram representation of an exemplary embodiment of the system for generating and interacting with a virtual model of a physical entity of FIG. 1 in accordance with an embodiment of the present disclosure.

Basically, for the user to be able to provide the one or more preferences, the user may have to be registered with the system 10. Therefore, the processing subsystem 20 may also include a registration module (as shown in FIG. 2) operatively coupled to the input module 30. The registration module may be configured to register the user with the system 10 upon receiving a plurality of user details via the user device. The plurality of user details may include at least one of a username, contact details, one or more login credentials, and the like corresponding to the user. The plurality of user details may be stored in a database associated with the system 10. In one exemplary embodiment, the database may be a local database or a cloud database. Also, in an embodiment, the user device may include a mobile phone, a tablet, a laptop, or the like.

Once the one or more preferences are received after the registration of the user, the one or more parameters mentioned by the user may have to be measured and the system 10 may also have to receive data corresponding to the one or more parameters, to generate the corresponding virtual model appropriately. Thus, the input module 30 is also configured to receive the data corresponding to the one or more parameters, based on the corresponding one or more preferences in real-time. The data includes at least one of two-dimensional (2-D) annotated data and 3-D annotated data. As used herein, the term "annotated data" refers to data or information which is labeled so that machines can use it. It is especially useful for supervised machine learning (ML), where the system 10 relies on labeled datasets to process, understand, and learn from input patterns to arrive at desired outputs. The data is captured via a plurality of data capturing units positioned in a predefined manner. The predefined manner enables the capturing of the data from a plurality of viewpoints.

In one exemplary embodiment, the plurality of data capturing units may include at least one of one or more cameras, one or more sensors, one or more rangers, and the like. The one or more cameras may include at least one of a wide-angle image capturing camera, a narrow-angle image capturing camera, a Time-of-Flight (ToF) camera, and the like. As used herein, the term "wide-angle image capturing camera" refers to a camera which is used to capture a snapshot of the environment to get the color information of the environment which is being scanned. Similarly, as used herein, the term "narrow-angle image capturing camera" refers to a camera being used to capture a focused aspect of the environment like features or textures in the spaces, which help the device identify distinct points in the space for referential input. Further, as used herein, the term "Time-of-Flight camera" refers to a camera being used as a range imaging system that employs a time-of-flight technique to resolve the distance between the camera and the object for each point of the image, by measuring the round trip time of an artificial light signal. The ToF camera is capable of detecting phase shifts between an illumination and a reflection. The ToF camera is being used to generate an accurate depth of an environment upon scanning by analyzing point cloud data generated from the ToF camera.

The one or more sensors may include at least one of a ToF sensor, an Inertial Measurement Unit (IMU) sensor, a Light Detection and Ranging (LiDAR) sensor, a temperature sensor, and the like. Basically, an array of strategically placed ToF sensors may be used for measurement accuracy at a relatively smaller range than the ToF ranger. Each of the ToF sensors is uniquely placed on each of four sides of a device to locate an exact position of the device relative to the environment that is being scanned. Further, in one embodiment, the IMU sensor may include a 9-axis IMU sensor. Basically, a combined operation of a 6-axis Accelerometer/Gyroscope sensor and 3-axis magnetometer will serve as the 9-axis IMU sensor in a device. The 9-axis IMU sensor is used in the device for calculating orientation, velocity, direction, and gravitational forces by combining Accelerometer, Gyroscope, and Magnetometer measurements. It is essential for the device as it is a handheld and portable device which needs accurate data about its position and movement. An accelerometer detects a rate of change in velocity of the device. Gyroscope detects rotational changes or maintains orientation. All this combined with the sensor information stated above enables the device to really find its accurate alignment within the scannable environment.

Furthermore, as used herein, the term "LiDAR sensor" refers to a sensor that emits pulsed light waves into the surrounding environment. These pulses bounce off surrounding objects and return to the sensor. The sensor uses the time it took for each pulse to return to the sensor to calculate the distance it traveled. Moreover, as used herein, the term "temperature sensor" refers to a sensor used to measure the real-time temperature of the device to keep in check any heating issues with it. The one or more rangers may include a ToF ranger. Therefore, as used herein, the term "ToF ranger" refers to a ranger used for depth measurement with a higher range than available from the ToF camera. Based on ToF principle, the ToF ranger can work under 1,00,000 Lux high light outdoor as well as low light indoor environments. The ToF ranger can resist disturbance from ambient light, airflow, and electrons, resulting in high data reliability. The ToF ranger may also be optimized by an optical system and algorithm to achieve better realization in outdoor ambient, different reflectivity backgrounds, and temperatures.

In one exemplary embodiment, the system 10 may also use a Real-Time Clock (RTC) for time stamping. Basically, in an embodiment, the RTC may be used for accurate time tracking for a processor, with an ability to keep time even when the device is in power off mode, through a backup power source. It imparts a time-stamping ability to the device which is a critical part of creating sensor fusion in the concerned technology system. Therefore, the system 10 may be using a sensor fusion technology by enabling the plurality of data capturing units to work together for generating the virtual model. As used herein, the term "sensor fusion technology" refers to a technology that performs merging of data from multiple sensors such that to reduce the amount of uncertainty that may be involved in a robot navigation motion or task performing.

Upon receiving the data corresponding to the one or more parameters, further processing may have to be performed on the data for obtaining the virtual model. Therefore, the processing subsystem 20 also includes a model generation module 40 operatively coupled to the input module 30. The model generation module 40 is configured to perform a fusion operation on the data received from each of the plurality of data capturing units, by synchronizing and performing spatial mapping of the data using artificial intelligence (AI), thereby generating point cloud data. The model generation module 40 is also configured to generate a crude virtual model corresponding to the physical entity based on the corresponding point cloud data.

As used herein, the term "fusion operation" refers to an operation that uses the sensor fusion technology. Further, as used herein, the term "artificial intelligence" is defined as a theory and development of computer systems that can perform tasks that normally require human intelligence. AI further evolved to machine learning (ML), deep learning (DL), natural language processing (NLP), computer vision, and the like. Therefore, spatial mapping refers to a form of an ML-based technique that is based on a geographic component. This approach to the use of location information will not only interpret the missing information but will also help more efficient solutions for specific geographical areas. Furthermore, as used herein, the term "point cloud" refers to a set of data points in space. The set of data points may represent a 3-D shape or a 3-D object. Each point position has its set of Cartesian coordinates (X, Y, Z). Point clouds are generally produced by 3-D scanners or by photogrammetry system, which measures many points on the external surfaces of objects around them. Therefore, the crude virtual model is generated using the point cloud data.

Basically, the crude virtual model may be associated with noise, and removal of the noise may be needed to get the virtual model which is clean and more accurate. Therefore, the processing subsystem 20 also includes a model improvement module 50 operatively coupled to the model generation module 40. The model improvement module 50 is configured to perform cleaning and optimization of the crude virtual model by creating one or more regular shapes corresponding to one or more elements associated with the crude virtual model, based on historic shape-related data using AI and iterative closest point (ICP) technique. The one or more elements may correspond to a digital representation of the plurality of objects associated with the physical entity. Further, in an embodiment, the historic shape-related data may be stored in the database. In one exemplary embodiment, the historic shape-related data may include information about at least one of one or more shapes, one or more colors, one or more objects, and the like. Further, in an embodiment, the cleaning and optimization of the crude virtual model may be done using AI and an iterative loop closure technique such as the ICP technique, to make the crude virtual model more precious and more accurate. As used herein, the term "iterative closest point" refers to is an algorithm employed to minimize the difference between two clouds of points. ICP is often used to reconstruct 2-D surfaces or 3-D surfaces from different scans, to localize robots and achieve optimal path planning (especially when wheel odometry is unreliable due to slippery terrain), to co-register bone models, and the like.

The model improvement module 50 is also configured to generate the virtual model corresponding to the physical entity upon performing the cleaning and optimization of the crude virtual model to remove noise. Further, the model improvement module 50 is also configured to identify the plurality of objects associated with the physical entity by performing an object detection operation on the corresponding virtual model using image processing. As used herein, the term "image processing" refers to a method to perform some operations on an image, in order to get an enhanced image or to extract some useful information from it. Further, as used herein, the term "object detection" refers to a computer technology related to computer vision and image processing that deals with detecting instances of semantic objects of a certain class in digital images and videos. Then, the plurality of objects is identified by drawing a bounding box around each object of interest in an image and assigning one or more labels to the corresponding plurality of objects based on the detection.

Furthermore, the model improvement module 50 is also configured to generate one or more sub-virtual models for the corresponding plurality of objects by performing a segmentation operation on the corresponding virtual model using image processing, upon identification. As used herein, the term "segmentation" refers to a process of image analysis in which interesting objects or regions from the image are extracted. In one exemplary embodiment, the one or more sub-virtual models may include one or more 3-D virtual models, wherein the one or more 3-D virtual models are a part of the virtual model of the physical entity.

Upon generating the virtual model and the one or more sub-virtual models, the user may be willing to interact with the corresponding virtual model and the corresponding one or more sub-virtual models. Therefore, the processing subsystem 20 also includes a model modification module 60 operatively coupled to the model improvement module 50. The model modification module 60 is configured to generate a trigger signal to be transmitted to the user, for modifying at least one of the virtual model and the one or more sub-virtual models. In one embodiment, the trigger signal may correspond to an electrical signal transmitted to the user via a transmission medium. In one exemplary embodiment, the transmission medium may include a wired transmission medium or a wireless transmission. Upon transmission of the trigger signal to the user, the user may receive the trigger signal in a form of a notification. The form of the notification may be a message, an e-mail, or the like.

Upon receiving the trigger signal, the user may provide certain inputs related to one or more changes which the user may be willing to do with the virtual model of the one or more sub-virtual models. Therefore, the model modification module 60 is also configured to receive one or more modification-related inputs from the user in real-time upon receiving the trigger signal. Further, the model modification module 60 is also configured to perform one or more modifications on at least one of the virtual model and the one or more sub-virtual models using one or more modification techniques, based on at least one of the corresponding one or more preferences and the corresponding one or more modification-related inputs, thereby generating and interacting with the virtual model of the physical entity.

In one exemplary embodiment, the one or more modification techniques may include at least one of object tracking, Generative Adversarial Networks (GAN), style transfer, photogrammetry, and the like. As used herein, the term "object tracking" is defined as the task of automatically identifying objects in a video and interpreting them as a set of trajectories with high accuracy. Further, as used herein, the term "Generative Adversarial Networks" refers to an approach to generative modeling using DL methods, such as convolutional neural networks (CNN). Generative modeling is an unsupervised learning task in ML that involves automatically discovering and learning regularities or patterns in input data in such a way that the model can be used to generate or output new examples that plausibly could have been drawn from the original dataset. Furthermore, as used herein, the term "style transfer" is defined as a computer vision technique that allows us to recompose the content of an image in the style of another. Also, as used herein, the term "photogrammetry" is defined as the science and technology of obtaining reliable information about physical objects and the environment through the process of recording, measuring, and interpreting photographic images and patterns of electromagnetic radiant imagery and other phenomena.

Suppose the user may be willing to have an orthographic 2-D view and a perspective 2-D view of the virtual model. Therefore, in an embodiment, the processing subsystem 20 may also include an alternative view generation module (as shown in FIG. 2) operatively coupled to the model modification module 60, wherein the alternative view generation module is configured to generate at least one of the orthographic two-dimensional view and the perspective two-dimensional view for the virtual model, based on one or more inside and outside cut properties corresponding to the virtual model.

FIG. 2 is a block diagram representation of an exemplary embodiment of the system 10 for generating and interacting with a virtual model of a physical entity of FIG. 1 in accordance with an embodiment of the present disclosure. Suppose kids 70 are playing a playground 80, and parents 90 of the corresponding kids 70 are willing to have a realistic view of the corresponding of the playground 80 along with the kids 70 who are playing there so that the parents 90 can monitor the kids 70 remotely. Therefore, the parents 90 can make use of the system 10 which includes the processing subsystem 20. The processing subsystem 20 is hosted on a cloud server 100. Basically, the parents 90 register with the system 10 via the registration module 110 by providing a plurality of personal details via a personal mobile phone 120. The plurality of personal details is stored in a cloud database 130 of the system 10. Upon registration, the parents 90 provide the one or more preferences corresponding to the generation of a playground virtual model 140 for the playground 80 along with the kids 70 via the input module 30. Then, the plurality of data capturing units 150 is positioned surrounding the playground 80 in a manner such that the data corresponding to the one or more parameters is captured from a plurality of viewpoints. The one or more parameters are related to objects 160 in the playground 80 such as grass, stones, slides, swings, balls, the kids 70, random people, or the like.

Therefore, the data captured is also received by the system 10 via the input module 30. Using the sensor fusion technology, the data received is analyzed and a crude virtual model is generated via the model generation module 40. Further, the crude virtual model generated is associated with noise. Thus, the crude virtual model is cleaned and optimized, and hence the playground virtual model 140 for the playground 80 along with one or more object-related-sub-virtual models 170 for the objects 160 in the playground 80 are generated via the model improvement module 50. Further, the parents 90 also have a facility of doing modifications in the virtual model of the playground 80 to improve a viewing experience of the parents 90. Therefore, the system 10 does that by generating the trigger signal to be transmitted to the parents 90, receiving the one or more modification-related inputs, and performing the corresponding one or more modifications on the playground virtual model 140 via the model modification module 60. Moreover, the parents 90 can also get an orthographic view or a perspective view of the playground virtual model 140 via the alternative view generation module 180. Thus, this is how the system 10 is assisting the parents 90 in generating and interacting with the playground virtual model 140 of the playground 80.

Figure 3:
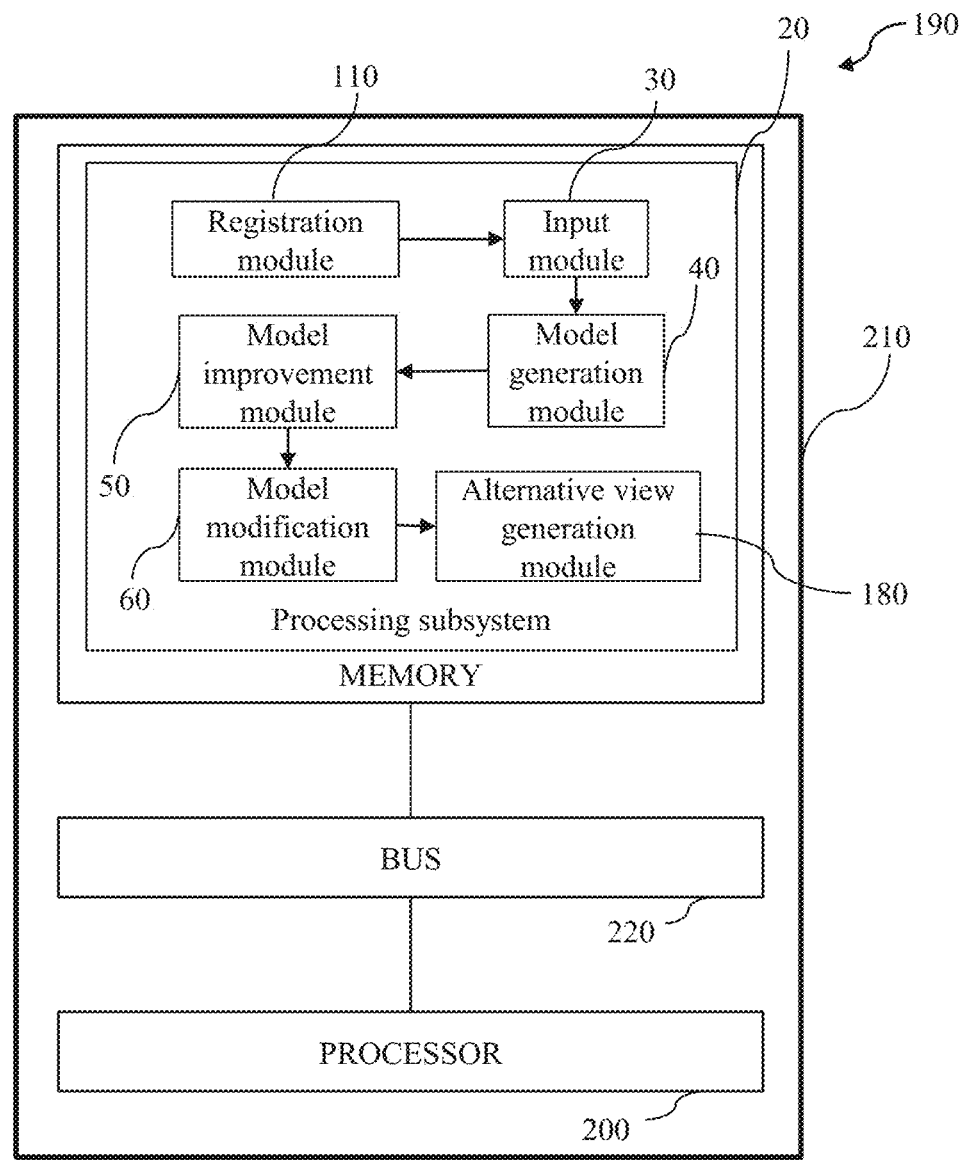
FIG. 3 is a block diagram of a virtual model controlling computer or a virtual model controlling server in accordance with an embodiment of the present disclosure.

FIG. 3 is a block diagram of a virtual model controlling computer or a virtual model controlling server 190 in accordance with an embodiment of the present disclosure. The virtual model controlling server 190 includes processor (s) 200, and a memory 210 operatively coupled to a bus 220.

The processor(s) 200, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 210 includes a plurality of subsystems and a plurality of modules stored in the form of executable program which instructs the processor(s) 200 to perform the method steps illustrated in FIG. 1. The memory 210 is substantially similar to the system 10 of FIG. 1. The memory 210 has following subsystems: a processing subsystem 20 including a registration module 110, an input module 30, a model generation module 40, a model improvement module 50, a model modification module 60, and an alternative view generation module 180.

The registration module 110 is configured to register the user with the system 10 upon receiving a plurality of user details via the user device.

The input module 30 is configured to receive one or more preferences from a user, upon registration, wherein the one or more preferences are corresponding to a generation of the virtual model. The input module 30 is also configured to receive data corresponding to one or more parameters, based on the corresponding one or more preferences in real-time. The data includes at least one of two-dimensional annotated data and three-dimensional annotated data. The data is captured via a plurality of data capturing units positioned in a predefined manner, wherein the predefined manner enables the capturing of the data from a plurality of viewpoints. The one or more parameters are corresponding to a plurality of objects associated with the physical entity.

The model generation module 40 is configured to perform a fusion operation on the data received from each of the plurality of data capturing units, by synchronizing and performing spatial mapping of the data using artificial intelligence, thereby generating point cloud data. The model generation module 40 is also configured to generate a crude virtual model corresponding to the physical entity based on the corresponding point cloud data.

The model improvement module 50 is configured to perform cleaning and optimization of the crude virtual model by creating one or more regular shapes corresponding to one or more elements associated with the crude virtual model, based on historic shape-related data using artificial intelligence. The model improvement module 50 is also configured to generate the virtual model corresponding to the physical entity upon performing the cleaning and optimization of the crude virtual model to remove noise. The model improvement module 50 is also configured to identify the plurality of objects associated with the physical entity by performing an object detection operation on the corresponding virtual model using image processing. The model improvement module 50 is also configured to generate one or more sub-virtual models for the corresponding plurality of objects by performing a segmentation operation on the corresponding virtual model using image processing, upon identification.

The model modification module 60 is configured to generate a trigger signal to be transmitted to the user, for modifying at least one of the virtual model and the one or more sub-virtual models. The model modification module 60 is also configured to receive one or more modification-related inputs from the user in real-time upon receiving the trigger signal. The model modification module 60 is also configured to perform one or more modifications on at least one of the virtual model and the one or more sub-virtual models using one or more modification techniques, based on at least one of the corresponding one or more preferences and the corresponding one or more modification-related inputs, thereby generating and interacting with the virtual model of the physical entity.

Computer memory elements may include any suitable memory device(s) for storing data and executable program, such as read only memory, random access memory, erasable programmable read only memory, electrically erasable programmable read only memory, hard drive, removable media drive for handling memory cards, and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 200.

Figure 4:
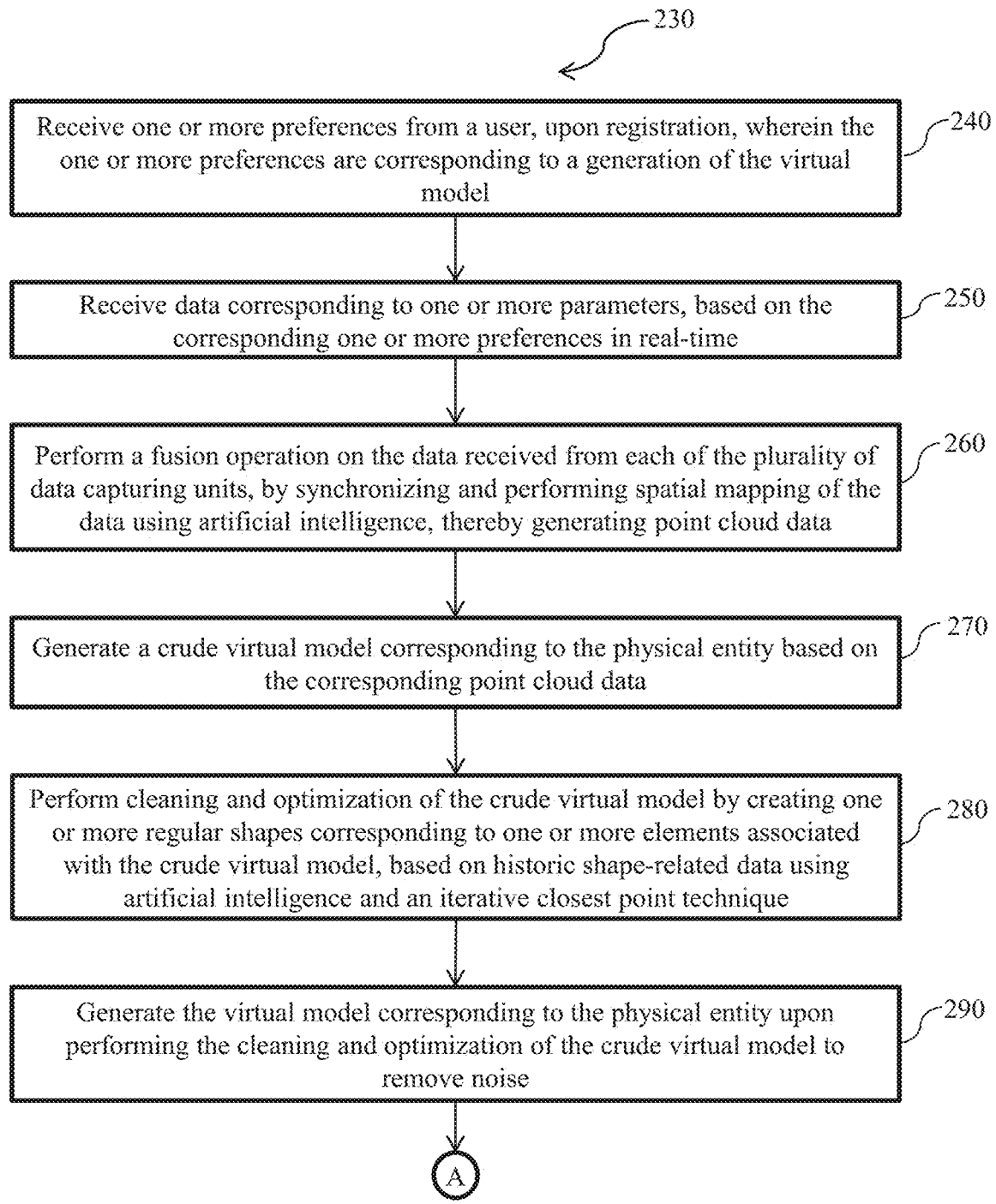
FIG. 4 (a) illustrates a flow chart representing the steps involved in a method generating and interacting with a virtual model of a physical entity in accordance with an embodiment of the present disclosure.
Figure 4:
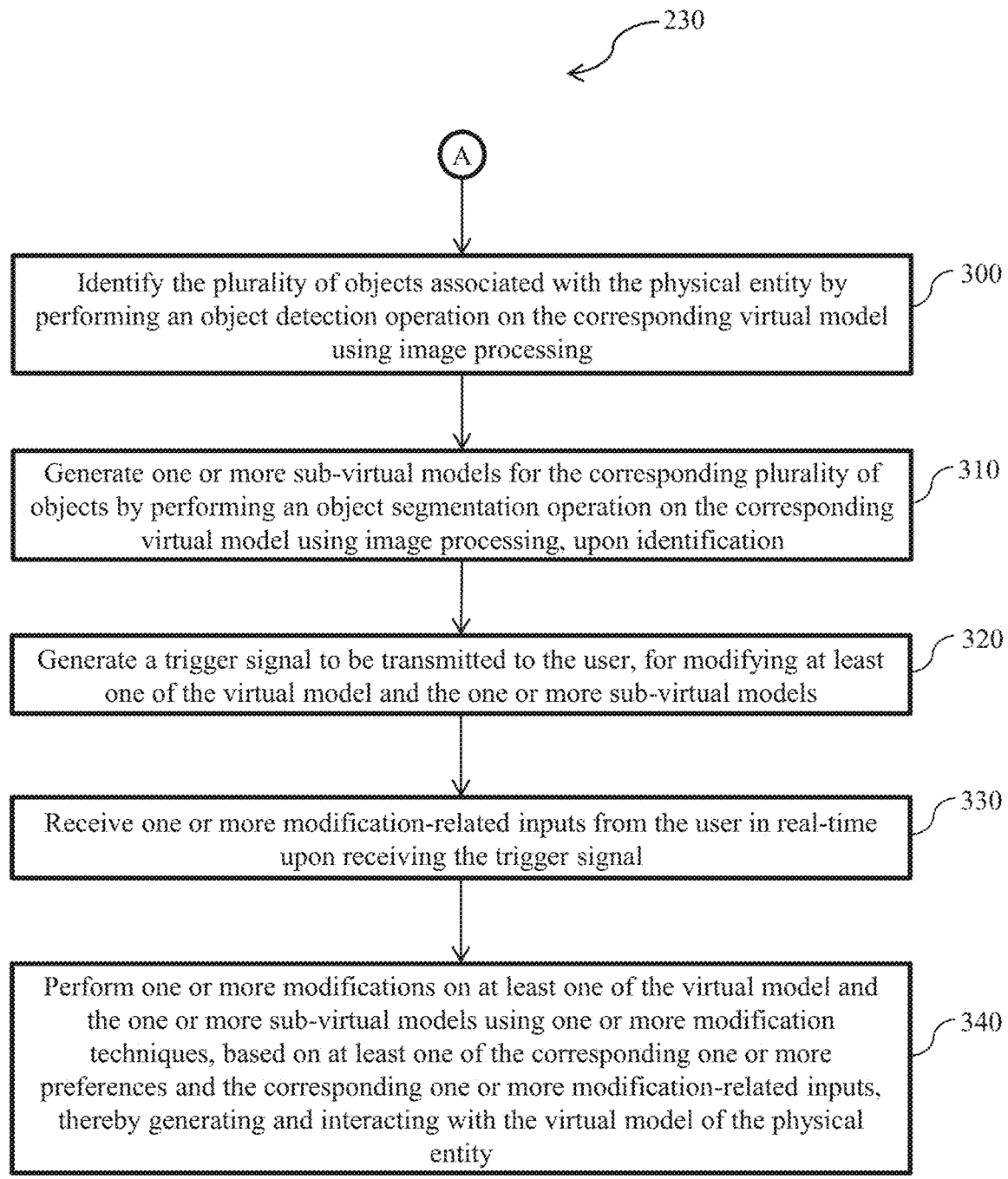

FIG. 4 (*a*) illustrates a flow chart representing the steps involved in a method 230 generating and interacting with a virtual model of a physical entity in accordance with an embodiment of the present disclosure. FIG. 4 (*b*) illustrates continued steps of the method 230 of FIG. 4 (*a*) in accordance with an embodiment of the present disclosure. The method 230 includes receiving one or more preferences from a user, upon registration, wherein the one or more preferences are corresponding to a generation of the virtual model in step 240. In one embodiment, receiving the one or more preferences may include receiving the one or more preferences via an input module 30. The method 230 further includes receiving data corresponding to one or more parameters, based on the corresponding one or more preferences in real-time in step 250. In one embodiment, receiving the data may include receiving the data via the input module 30.

Further, the method 230 also includes performing a fusion operation on the data received from each of the plurality of data capturing units, by synchronizing and performing spatial mapping of the data using artificial intelligence, thereby generating point cloud data in step 260. In one embodiment, performing the fusion operation may include performing the fusion operation via a model generation module 40. Furthermore, the method 230 also includes generating a crude virtual model corresponding to the physical entity based on the corresponding point cloud data in step 270. In one embodiment, generating the crude virtual model may include generating the crude virtual model via the model generation module 40.

Furthermore, the method 230 also includes performing cleaning and optimization of the crude virtual model by creating one or more regular shapes corresponding to one or more elements associated with the crude virtual model, based on historic shape-related data using artificial intelligence in step 280. In one embodiment, performing the cleaning and optimization of the crude virtual model may include performing the cleaning and optimization of the crude virtual model via a model improvement module 50.

Furthermore, the method 230 also includes generating the virtual model corresponding to the physical entity upon performing the cleaning and optimization of the crude virtual model to remove noise in step 290. In one embodiment, generating the virtual model may include generating the virtual model via the model improvement module 50.

Furthermore, the method 230 also includes identifying the plurality of objects associated with the physical entity by performing an object detection operation on the corresponding virtual model using image processing in step 300. In one embodiment, identifying the plurality of objects may include identifying the plurality of objects via the model improvement module 50.

Furthermore, the method 230 also includes generating one or more sub-virtual models for the corresponding plurality of objects by performing a segmentation operation on the corresponding virtual model using image processing, upon identification in step 310. In one embodiment, generating the one or more sub-virtual models may include generating the one or more sub-virtual models via the model improvement module 50.

Furthermore, the method 230 also includes generating a trigger signal to be transmitted to the user, for modifying at least one of the virtual model and the one or more sub-virtual models in step 320. In one embodiment, generating the trigger signal may include generating the trigger signal via a model modification module 60.

Furthermore, the method 230 also includes receiving one or more modification-related inputs from the user in real-time upon receiving the trigger signal in step 330. In one embodiment, receiving the one or more modification-related inputs may include receiving the one or more modification-related inputs via the model modification module 60.

Furthermore, the method 230 also includes performing one or more modifications on at least one of the virtual model and the one or more sub-virtual models using one or more modification techniques, based on at least one of the corresponding one or more preferences and the corresponding one or more modification-related inputs, thereby generating and interacting with the virtual model of the physical entity in step 340. In one embodiment, performing the one or more modifications may include performing the one or more modifications via the model modification module 60.

In one exemplary embodiment, the method 230 may further include generating at least one of an orthographic two-dimensional view and a perspective two-dimensional view for the virtual model, based on one or more inside and outside cut properties corresponding to the virtual model. In such embodiment, generating at least one of the orthographic two-dimensional view and the perspective two-dimensional view for the virtual model may include generating at least one of the orthographic two-dimensional view and the perspective two-dimensional view for the virtual model via an alternative view generation module 180.

Various embodiments of the present disclosure enable the system for generating and interacting with the virtual model of the physical entity, with precise extraction of features associated with the physical entity and capturing relevant spatial metrics. Further, the system enables the generation of the virtual model at a faster pace using AI and sensor fusion technology and covering a distance of about a few centimeters to about a few hundred meters.

Furthermore, the system also enables auto and manual creation of a walkthrough while considering or filtering cases like occlusion, visibility, and focal length. Moreover, the system can be interfaced with Augmented Reality for precise interpretation of a live environment in real-time. The system can also be interfaced with Virtua Reality technology and devices, the application being visualizing, interacting, and navigating through a virtually available space. Additionally, the system can also be interfaced with Mixed Reality to have a quickly generated simulated view of a live environment on adding 3-D models. Furthermore, the system can also be interfaced with Extended Reality, thereby adding more experience to virtual walkthroughs by creating virtual avatars for enabling interaction and modifications in an environment.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing subsystem" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A system for generating and interacting with a virtual model of a physical entity comprising:
   a processing subsystem configured to execute on a network to control bidirectional communications among a plurality of modules comprising:
   an input module configured to:
      receive one or more preferences from a user, upon registration, wherein the one or more preferences are corresponding to a generation of the virtual model; and
      receive data corresponding to one or more parameters, based on the corresponding one or more preferences in real-time,
         wherein the data comprises at least one of two-dimensional annotated data and three-dimensional annotated data,
         wherein the data is captured via a plurality of data capturing units positioned in a predefined manner, wherein the predefined manner enables the capturing of the data from a plurality of viewpoints,
         wherein the one or more parameters are corresponding to a plurality of objects associated with the physical entity;

a model generation module operatively coupled to the input module, wherein the model generation module is configured to:
  perform a fusion operation on the data received from each of the plurality of data capturing units, by synchronizing and performing spatial mapping of the data using artificial intelligence, thereby generating point cloud data; and
  generate a crude virtual model corresponding to the physical entity based on the corresponding point cloud data;
a model improvement module operatively coupled to the model generation module, wherein the model improvement module is configured to:
  perform cleaning and optimization of the crude virtual model by creating one or more regular shapes corresponding to one or more elements associated with the crude virtual model, based on historic shape-related data using artificial intelligence and an iterative closest point technique;
  generate the virtual model corresponding to the physical entity upon performing the cleaning and optimization of the crude virtual model to remove noise;
  identify the plurality of objects associated with the physical entity by performing an object detection operation on the corresponding virtual model using image processing; and
  generate one or more sub-virtual models for the corresponding plurality of objects by performing a segmentation operation on the corresponding virtual model using image processing, upon identification; and
a model modification module operatively coupled to the model improvement module, wherein the model modification module is configured to:
  generate a trigger signal to be transmitted to the user, for modifying at least one of the virtual models and the one or more sub-virtual models;
  receive one or more modification-related inputs from the user in real-time upon receiving the trigger signal; and
  perform one or more modifications on at least one of the virtual models and the one or more sub-virtual models using one or more modification techniques, based on at least one of the corresponding one or more preferences and the corresponding one or more modification-related inputs, thereby generating and interacting with the virtual model of the physical entity.

2. The system of claim 1, wherein the virtual model comprises a three-dimensional virtual model.

3. The system of claim 1, wherein the one or more parameters comprises at least one of distance, color, alignment, movement, and temperature.

4. The system of claim 1, wherein the plurality of data capturing units comprises at least one of one or more cameras, one or more sensors, and one or more rangers.

5. The system of claim 4, wherein the one or more cameras comprises at least one of a wide-angle image capturing camera, a narrow-angle image capturing camera, and a Time-of-Flight camera.

6. The system of claim 4, wherein the one or more sensors comprises at least one of a Time-of-Flight sensor, an Inertial Measurement Unit sensor, a Light Detection and Ranging sensor, and a temperature sensor.

7. The system of claim 4, wherein the one or more rangers comprises a Time-of-Flight ranger.

8. The system of claim 1, wherein the one or more modification techniques comprises at least one of object tracking, Generative Adversarial Networks, style transfer, and photogrammetry.

9. The system of claim 1, wherein the processing subsystem comprises an alternative view generation module operatively coupled to the model modification module, wherein the alternative view generation module is configured to generate at least one of an orthographic two-dimensional view and a perspective two-dimensional view for the virtual model, based on one or more inside and outside cut properties corresponding to the virtual model.

10. A method for generating and interacting with a virtual model for a real-world three-dimensional environment comprising:
  receiving, via an input module, one or more preferences from a user, upon registration, wherein the one or more preferences are corresponding to a generation of the virtual model;
  receiving, via the input module, data corresponding to one or more parameters, based on the corresponding one or more preferences in real-time;
  performing, via a model generation module, a fusion operation on the data received from each of a plurality of data capturing units, by synchronizing and performing spatial mapping of the data using artificial intelligence, thereby generating point cloud data;
  generating, via the model generation module, a crude virtual model corresponding to a physical entity based on the corresponding point cloud data;
  performing, via a model improvement module, cleaning and optimization of the crude virtual model by creating one or more regular shapes corresponding to one or more elements associated with the crude virtual model, based on historic shape-related data using artificial intelligence and an iterative closest point technique;
  generating, via the model improvement module, the virtual model corresponding to the physical entity upon performing the cleaning and optimization of the crude virtual model to remove noise;
  identifying, via the model improvement module, a plurality of objects associated with the physical entity by performing an object detection operation on the corresponding virtual model using image processing;
  generating, via the model improvement module, one or more sub-virtual models for the corresponding plurality of objects by performing a segmentation operation on the corresponding virtual model using image processing, upon identification;
  generating, via a model modification module, a trigger signal to be transmitted to the user, for modifying at least one of the virtual models and the one or more sub-virtual models;
  receiving, via the model modification module, one or more modification-related inputs from the user in real-time upon receiving the trigger signal; and
  performing, via the model modification module, one or more modifications on at least one of the virtual models and the one or more sub-virtual models using one or more modification techniques, based on at least one of the corresponding one or more preferences and the corresponding one or more modification-related inputs, thereby generating and interacting with the virtual model of the physical entity.

11. The method of claim 10, comprising generating, via an alternative view generation module, at least one of an orthographic two-dimensional view and a perspective two-dimensional view for the virtual model, based on one or more inside and outside cut properties corresponding to the virtual model.

\* \* \* \* \*